Jan. 18, 1966     D. E. WILCOX     3,229,376

PENDULOUS GYROCOMPASS

Original Filed April 26, 1961     4 Sheets-Sheet 1

INVENTOR.
DOYLE E. WILCOX

INVENTOR.
DOYLE E. WILCOX

INVENTOR.
DOYLE E. WILCOX

Jan. 18, 1966        D. E. WILCOX        3,229,376
PENDULOUS GYROCOMPASS
Original Filed April 26, 1961        4 Sheets-Sheet 4
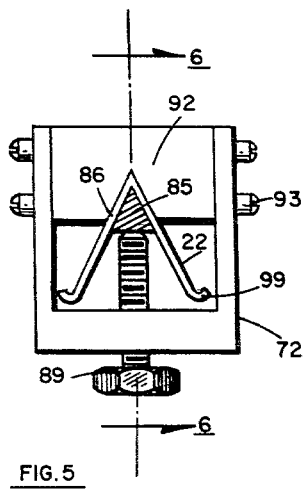
FIG. 5
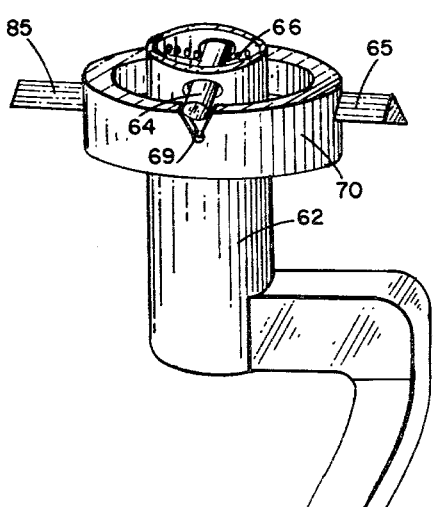
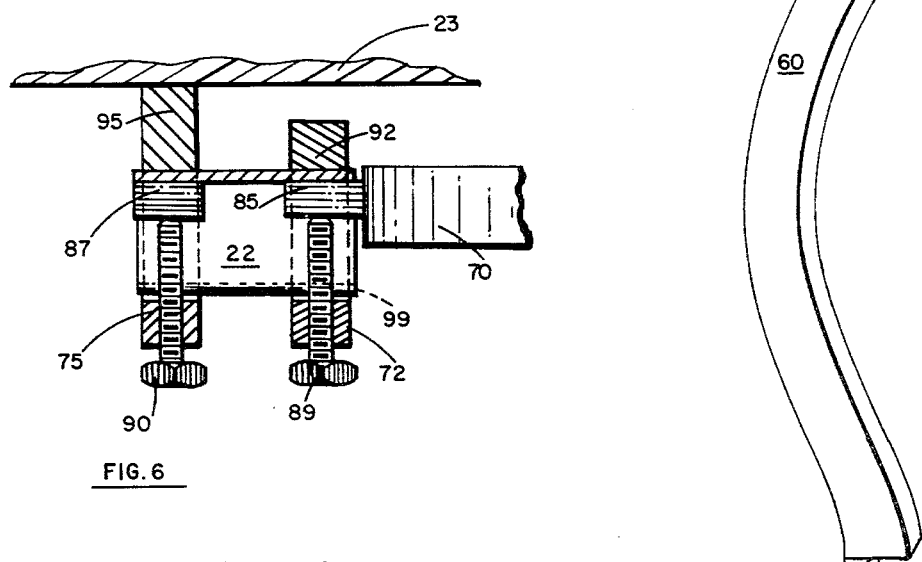
FIG. 6
FIG. 7
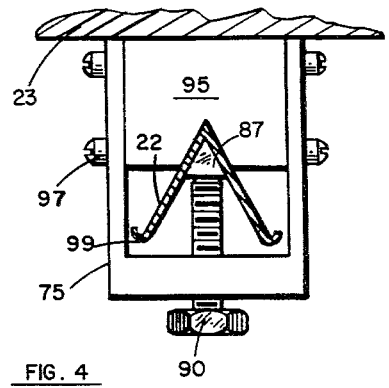
FIG. 4
INVENTOR.
DOYLE E. WILCOX United States Patent Office 3,229,376
Patented Jan. 18, 1966

3,229,376
PENDULOUS GYROCOMPASS
Doyle E. Wilcox, Hacienda Heights, Calif., assignor to North American Aviation, Inc.
Continuation of application Ser. No. 105,577, Apr. 26, 1961. This application Jan. 2, 1964, Ser. No. 335,040
8 Claims. (Cl. 33—226)

This application is a continuation of the now abandoned application Serial Number 105,577, filed April 26, 1961, by Doyle E. Wilcox for "Pendulous Gyrocompass" and assigned to North American Aviation, Inc.

This invention relates to a pendulous gyrocompass, and more particularly to a gyrocompass for measuring direction in azimuth and earth latitude, in which the gyroscope is pendulously suspended about its input axis.

A gyrocompass is an apparatus for establishing a meridian reference by locating the earth's rotation axis by gyroscopic means. The operation of a gyroscope depends on the ability to sense absolute angular velocity, i.e., angular velocity in inertial space. A gyroscope mounted on the rotating earth will have an output depending on its orientation relative to the earth's axis. The gyroscope will produce an output signal due to the earth's rotation rate unless its sensing or reference axis lies parallel to the equatorial plane of the earth. If the gyroscope has zero signal output at the same time that its sensing axis is constrained to be horizontal, then the sensing or input axis must be along an east-west line.

A gyrocompass for precisely measuring directions in azimuth and earth latitude is described in Patent No. 2,972,195, issued February 21, 1961, to M. E. Campbell et al. for "Gyrocompass," assigned to North American Aviation, Inc., the assignee of this invention. The device described in Patent No. 2,972,195 uses a single-axis gyroscope with an output axis pickoff, the output of which is used to control an output axis torquer. The gyroscope case is adjustable in azimuth. When the input axis is not aligned with the east-west line, a torquing current is present which drives the torquer to keep the pickoff at a null position. In establishing the east-west line, the gyroscope case is adjusted in azimuth until the torquing current is minimum. There will be a minimum torquing current only when the input axis is aligned with an earth horizontal east-west line as this is the position in which the earth imparts a minimum rotation rate about the input axis of the gyroscope.

In Patent No. 2,972,195, the case of the gyroscope is tied to the earth through a support stand. The output or pointing accuracy is therefore very sensitive to minute rotation rates about the input axis of the gyroscope. Such rotation rate inputs may result from uneven settling rates of the gyrocompass tripod legs into the ground, from uneven expansion or contraction of the legs due to uneven warming or cooling, or from surrounding vehicular traffic, for example. The effects of such rotation rate inputs about the gyroscope input axis significantly detract from the accuracy of the gyrocompass. It is an object of this invention to eliminate such rotation rate inputs. This is accomplished by pendulously suspending the gyroscope about a horizontal axis relative to the supporting structure so that rotation of the supporting structure about that axis of pendulous suspension is not transmitted to the gyroscope. If ball-bearings, journal bearings, and the like were used to support the gyroscope case along its axis of suspension, because of the finite friction in the bearings (particularly at small angles) isolation between the support and the gyroscope would not be complete. Complete isolation between the support and the gyroscope case is achieved by using flexure type bearings to support the gyroscope case about its horizontal axis of pendulous support relative to the supporting structure. The gyroscope case is suspended on a pair of flexure type bearings from a support frame. The support frame is rotatably mounted on a mount which is directly tied to the earth. The gyroscope case is suspended from the frame with a single degree of freedom, i.e., about is horizontal axis of suspension, designated its input axis, and is therefore effectively isolated from rotation rates about this axis of suspension, designated its input axis, and is therefore effectively isolated from rotation rates about this axis due to motion of the mount on which it is supported. The frame from which the gyroscope case is pendulously supported is rotatably attached to the mount so that it and the gyroscope case can be adjusted in azimuth.

It is therefore an object of this invention to provide an improved gyrocompass.

It is another object of this invention to provide improved means for pendulously suspending the gyroscope of a gyrocompass with freedom about a horizontal axis.

It is yet another object of this invention to provide improved means for pendulously suspending the gyroscope of a gyrocompass with freedom about an input axis.

It is still another object of this invention to improve the accuracy of gyrocompasses.

It is still a further object of this invention to provide an improved gyrocompass in which the gyroscope-rate-accepting or input axis is effectively isolated from the effect of rotation rates due to movement of the gyrocompass mount.

Other objects of this invention will become apparent from the following description taken in connection with the accompanying drawings in which FIG. 1 schematically illustrates a gyrocompass embodying the structural features of this invention;

FIG. 4 is a cross-sectional view taken along a plane as indicated by the line 4—4 in FIG. 3;

FIG. 5 is a cross-sectional view taken along a plane indicated by the line 5—5 in FIG. 3;

FIG. 6 is a cross-sectional view taken along a plane as indicated by the line 6—6 in FIG. 5; and FIG. 7 is a perspective view of the mounting device utilized in the embodiment illustrated in FIG. 3.

Figure 1:
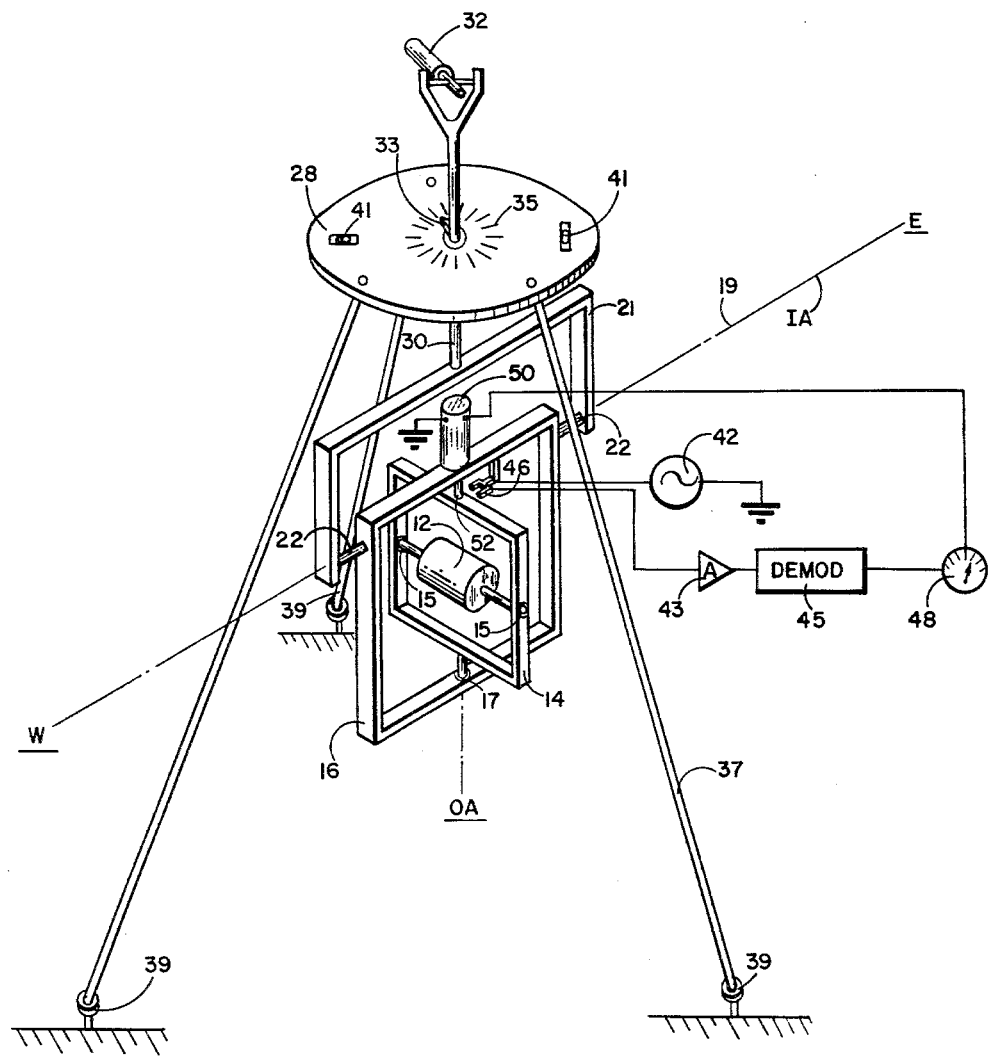

In FIG. 1, a gyroscope rotor 12 is rotatably mounted on gimbal 14 by means of bearings 15 which define the rotor spin axis. Rotor 12 is adapted to be spun by means known in the art (not shown) such as—for example—an electrical motor, a gas turbine, or the like. Gimbal 14 (here representing the rotor housing), is rotatably mounted on gyroscope case 16 (here represented as a ring) on bearings 17 which define the gyroscope output axis perpendicular to the axis of spin of rotor 12. The gyroscope input axis is defined as orthogonal to both the gyroscope output axis and the rotor spin axis. The gyroscope case 16 is pendulously suspended from frame 21, about horizontal axis 19, by means of flexure type bearings 22. The gyroscope case 16 is pendulously suspended in bearings 22 so that, relative to the support frame 21, it has freedom about the horizontal axis of support 19 and is substantially constrained about a vertical axis and the spin axis.

The spring rate of flexure bearings 22 is defined as the amount of torque required to rotate the two ends of one bearing relative to each other through a unit angle. A typical unit of spring rate is "dynecentimeters per radian."

The pendulous spring rate of the gyroscope is defined as the mass of the gysoscope times the acceleration of gravity, times the distance between the axis of suspension 19 and the center of mass of the gyroscope, times the sine of the angle between the locally vertical gravity direction and a line in a plane perpendicular to axis 19, connecting axis 19 and the center of mass of the gyroscope, all divided by the last defined angle. Since the last defined angle is very small, the sine of that angle is substantially equal to that angle whereby the pendulous spring rate of the gyroscope is equal to the mass of the gyroscope multiplied by the acceleration of gravity, multiplied by the perpendicular distance between the center of the mass of the gyroscope and axis 19. Flexure bearing 22 should be designed so their spring rates are much lower than the pendulous spring rate of the gyroscope about axis 19 so that any actual rotation rate of mount 21 about the input axis is reduced by the ratio of these two rates insofar as any effect to the gyroscope is concerned. Bearings 22 must be constructed so that they substantially constrain gyroscope case 16 relative to mount 21 about a vertical axis and the gyroscope spin axis.

Frame 21 is rotatably mounted on mount 28 by being fixedly attached to a supporting post 30 which is in turn fixedly connected to the rotatable or alidade portion of theodolite 34 so as to move in azimuth with the theodolite telescope 32. A pointer 33 is attached to support post 30 for indicating the azimuth position of telescope 32, support post 30, and frame 21 relative to mount 28. Mount 28 has an azimuth scale 35 thereon for providing azimuth readings. Mount 28 has a tripod leg support 37 and leveling screws 39 are used to adjust the mount to earth horizontal. Bubble levels 41 are attached to mount 28 and are used to indicate when the desired end result has been achieved. The azimuth pointer 33, azimuth scale 35, leveling screws 39, and bubble level 41 may all be included with the structure of the theodolite.

To make the gyrocompass operate, an output axis pickoff 46 for sensing displacement of the gimbal 14 relative to the gyroscope case 16 about the output axis and means for torquing the gimbal 14 relative to the gyroscope case about the output axis are utilized. In addition, means for measuring the torque necessary to null the pickoff output is provided. Output axis pickoff 46 senses the displacement of the gimbal 14 relative to the case 16 about the output axis. A reference voltage for this pickoff is typically supplied by A.C. reference source 42. The output of pickoff 46 is amplified in amplifier 43 and demodulated in phase sensitive demodulator 45 which produces a torquing current indicative of the amount and sense of torque generated by torquing means 50. The output current of demodulator 45 is measured by ammeter 48 and then fed to torquing motor 50 which is mounted to generate torque between case 16 and gimbal 14. The case of motor 50 may be mounted upon gimbal 16. The output shaft 52 of motor 50 is connected to drive gimbal 14 rotatably in its bearings 17, these bearings being mounted on case 16. Alternatively, the case of motor 50 may be mounted on gimbal 14 to apply torque to the shaft between gimbal 14 and case 16.

Briefly, the device is operated to determine the east-west line as follows: The mount 28, and along with it frame 21, are first leveled by means of leveling screws 39 using the liquid bubble levels 41 for level indication. The spin axis of the gyroscope rotor 12, defined by bearing 15, is pointed approximately along a north-south line. With the gyroscope rotor 12 not energized, the servo loop between pickoff 46 and torquing motor 50 is closed, and ammeter 48 is observed for minimum indication which will occur when pickoff 46 reaches a null position. Gyroscope rotor 12 is now energized and ammeter 48 allowed to settle to a stable reading. If the input axis 19 is not aligned with an east-west line, an earth rate vector component will exist along this axis which will require a torque to be developed about the output axis to keep pickoff 46 nulled. This torque will be indicated by ammeter 48. The direction of the input axis is slowly changed by manual rotation of shaft 30 and, along with it frame 21 and gyroscope case 16 about the axis of shaft 30 until ammeter 48 indicates zero. The input axis 19 will then be alined with the east-west line and pointer 33 in conjunction with telescope 32 may be utilized to read the true bearing of the target. Telescope 32 with its associated support and azimuth scale will generally comprise a theodolite or similar azimuth measuring device.

Figure 2:
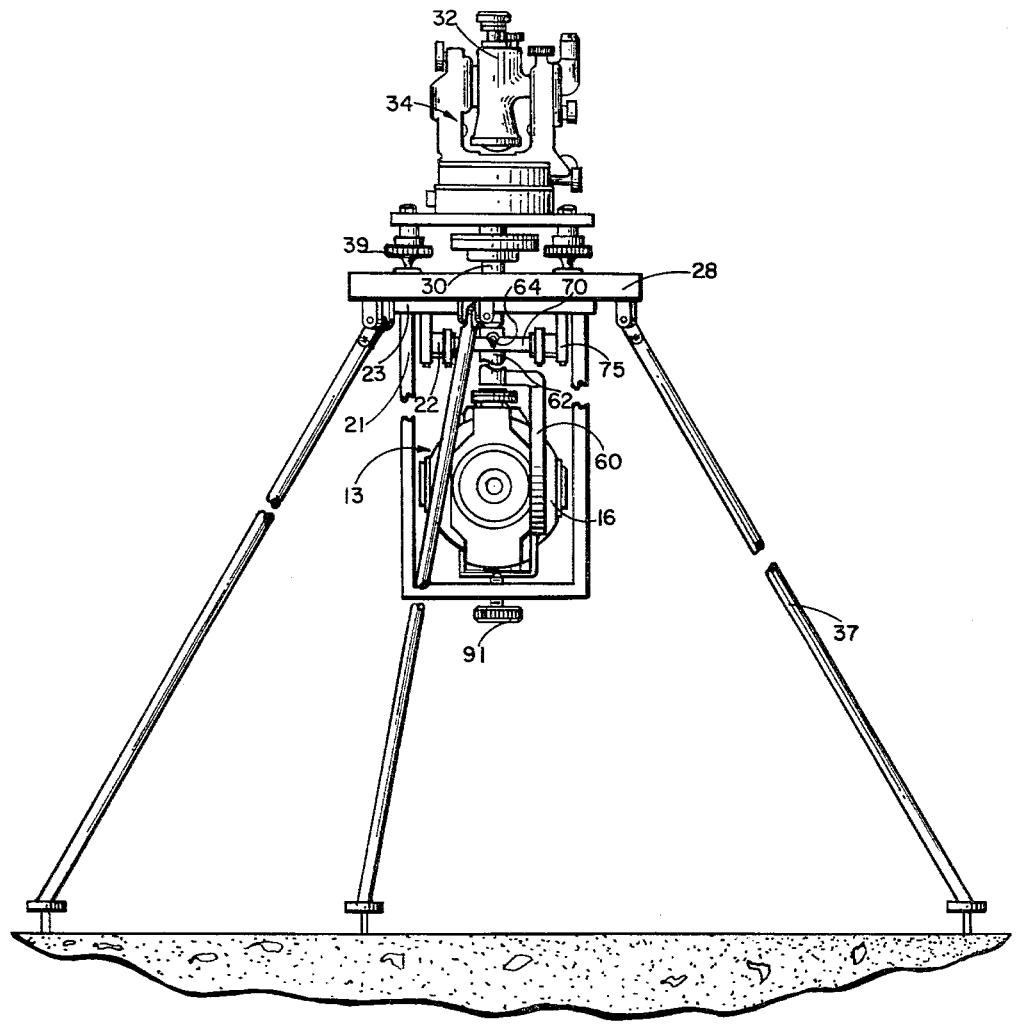
FIG. 2 is an elevation view of the outside of a typical device constructed in accordance with this invention the gyroscope support bracket being shown in a caged condition.
Figure 3:
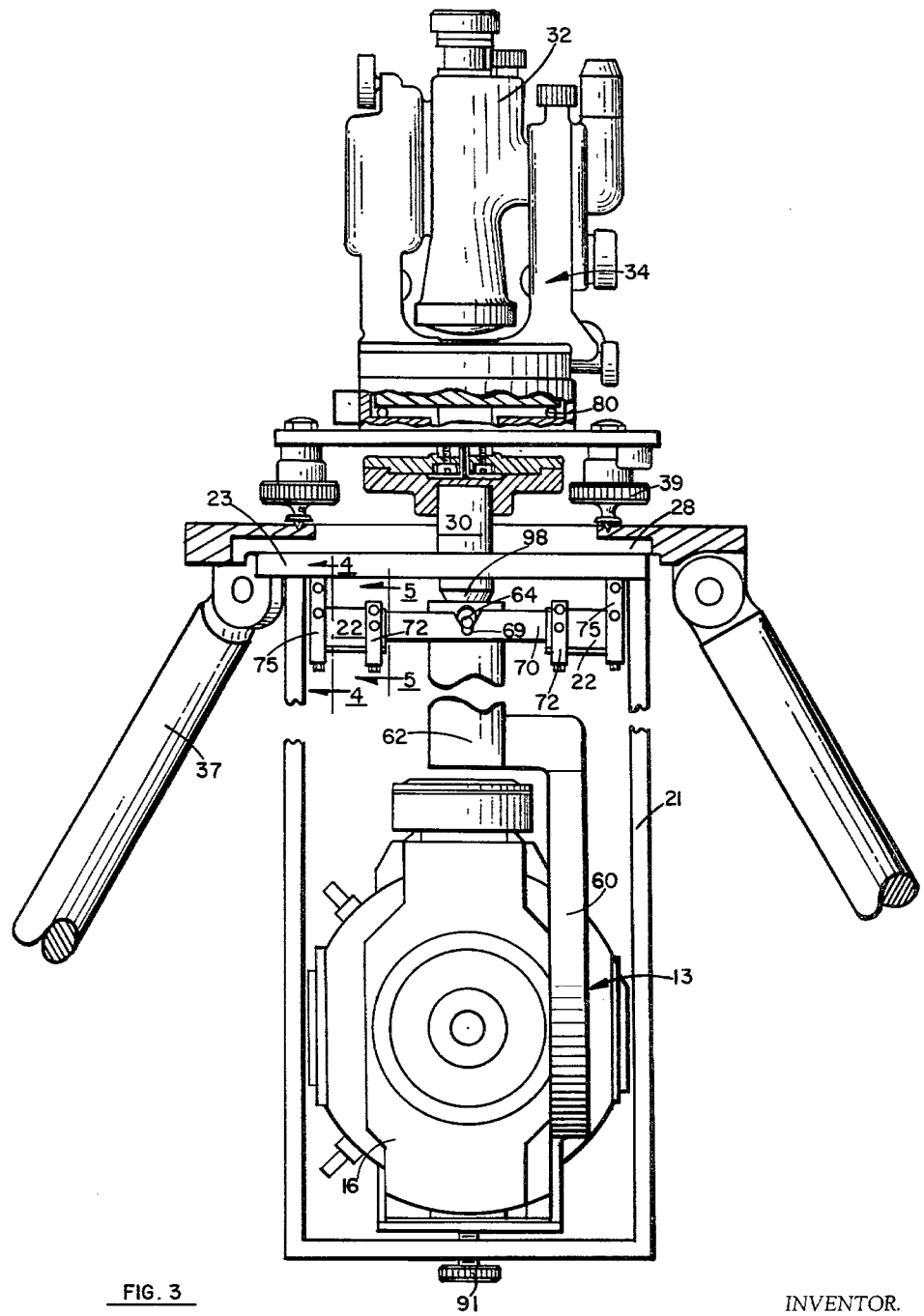
FIG. 3 is an elevation view of the embodiment illustrated in FIG. 2 with partial cross-section illustrating the details of a preferred pendulous suspension used to support the gyroscope.

Referring now to FIGS. 2 and 3, the details of a preferred embodiment of the flexure pivot support used in the gyrocompass of this invention are illustrated. Gyroscope 13 is supported in support bracket 60 which is fixedly attached to gyroscope case 16 and support post 62. Support post 62 is attached to support pin 64 by means of coil springs 66, one end of each of which is attached to the support pin, the other end of each thereof being attached to the support post (see FIG. 7). Pin 64 is supported in groove 69 of mounting ring 70. Mounting ring 70 is attached to one end of each of the flexure bearings 22 by means to be explained in connection with FIGS. 4–7. The other ends of flexure bearings 22 are attached to mount 28 by means of clamps 75 as will be explained in connection with FIG. 4.

The gyroscope 13 is thus suspended from frame 21 pendulously on flexure bearings 22 which permit freedom of motion about a single axis. Pin 64 is fairly tightly held to support post 62 by springs 66. Grooves 69 in support ring 70 form high friction bearings for pin 64 which for operational purposes permit no significant freedom of motion about the longitudinal axis of the pin. Similarly, springs 66 substantially constrain pin 64 from rotating. Springs 66 and the means shown in FIG. 7 for supporting pin 64 on ring 70 are used to prevent damage to flexure bearings 22 is the gyroscope 13 is inadvertently jarred. This structure provides a relief mechanism to minimize the transfer of shock to the flexure bearings. Flexure bearings 22 thus permit substantial freedom about the gyroscope input axis so that rotation rates about this axis cannot be transferred to the gyroscope. At the same time, the gyroscope is substantially constrained about the gyroscope's spin axis and about a vertical axis.

The alidade portion of theodolite 34 can be rotated on its vertical axis bearings 80. With the rotation of the telescope of theodolite 34 on its vertical axis bearings 80, frame 21 will also be rotated.

Leveling screws 39 are utilized to level the theodolite and frame 21 which is attached thereto. Caging screw 91 is used to cage the gyroscope case in the frame during transportation. When screw 91 is tightened, it will force bracket 60 upwards and drive support post 62 into engagement with snubber 98 which is formed in the end of post 30. Snubber 98 is shaped in the form of a truncated cone and its surface engages the inner wall of support post 62 when caging screw 91 is tightened. The gyroscope 13 will thus be securely retained in frame 21 during transportation thereby minimizing the chances of damage to the equipment.

Referring now to FIGS. 4–7, the details of the flexure bearings and the means by which they are mounted are illustrated. As indicated in FIG. 7, mounting ring 70 has a pair of triangular shaped support pins 65 and 85 extending therefrom. As indicated in FIGS. 4 and 6, support pin 85 is attached to one end of flexure bearing 22. Each of the flexures 22 is V-shaped and the vertex of the V formed thereby mates with the triangular configuration of its associated pin 85. Each flexure bearing 22 is attached to an associated pin 65 or 85 at one end thereof by cementing and by clamping by means of clamp 72. Clamp 72 has a metal block 92 with a V-shaped indentation 86 formed therein to match the configuration of flexure 22. Metal block 92 is fixedly attached to the arms of clamp 72 by means of screws 93. Screw 89 is threadably engaged with the bottom of clamp 72 and when tightened securely clamps pin 85 to flexure 22 with the outer surface of flexure 22 abutting against the mating wall 86 of metal block 92.

The other end of flexure 22 is joined to pin 87 and clamp 75 which is similar in construction to clamp 72 and has a block 95 similar in configuration to metallic block 92. The flexure 22 is securely held to clamp 75 by cementing and by means of screw 90 which is threadably engaged with clamp 75 and which is tightened to force pin 87 against flexure 22, the outside walls of which abut against the mating walls of block 95. Block 95 is fixedly attached to the horizontal portion 23 of frame 21. Clamp 75 is attached to block 95 by means of screws 97. As can be seen in FIG. 6, ring 70 is thus attached to one end of flexure 22 while the other end of the flexure is attached to the top portion 23 of frame 21. Mounting ring 70 is thus free to move on flexure bearings 22 about an axis defined by the longitudinal axes of pins 85 and 87.

Edges 99 which form the ends of the legs of the V formed by flexures 22 are bent over at an angle of approximately 90 degrees. The bending of the ends of the V provides considerable resistance to the buckling of the legs of the V. This enables the use of flexures of lesser thickness for given buckling stress requirement. By utilizing a flexure 22 having a lesser thickness, the torsional spring rate about the longitudinal axis of the flexure can be substantially reduced. Therefore, by bending the ends of the flexures, a more efficient flexure bearing is obtained having a considerably higher ratio of torsional to bending spring rate. Flexures 22 should be fabricated of a suitable high alloy steel. Flexures fabricated of Elgiloy available from the Elgin Watch Company have been found to operate satisfactorily. Elgiloy is composed of 40% cobalt, 20% chromium, 15% nickel, 7% molybdenum, 0.5% carbon, 0.04% beryllium and the remainder iron.

The device of this invention is an extremely precise gyrocompass utilizing a highly efficient means for pendulously suspending the sensing gyroscope for freedom of rotation about a horizontal axis with the gyroscope case substantially constrained about the rotation axis of the gyroscope and about the vertical axis. The gyroscope so suspended is incorporated into a gyrocompass for accurately determining true direction.

Although the invention has been described and illustrated in detail, it is to be clearly understood that the same is by way of illustration and example only and is not to be taken by way of limitation, the spirit and scope of this invention being limited only by the terms of the appended claims.

I claim:
1. A gyrocompass comprising:
a rotor having a spin axis, first bearings supporting said rotor for rotation about said spin axis, a gimbal supporting said rotor bearings, second bearings supporting said gimbal for rotation about an axis perpendicular to said spin axis, a gyroscope case supporting said second bearings, a frame, flexure bearing means for suspending said gyroscope case from said frame pendulously with angular freedom about only a horizontal axis perpendicular to said axis of support of said gimbal, pickoff means for detecting rotational displacement of said gimbal relative to said case, servo means disposed on one of said gimbal or said case acting upon the other to apply torquing action and reaction between said gimbal and said case and responsive to said pickoff means for orienting said gimbal relative to said case to minimize the output of said pickoff means.

2. The device as recited in claim 1 wherein said servo means comprises an amplifier connected to receive the output of said pickoff means and a motor responsive to the output of said amplifier, and wherein said motor is mounted on said case.

3. The device as recited in claim 2 and further comprising current measuring means electrically connected between said amplifier and said motor for measuring the current fed from said amplifier to said motor.

4. A gyrocompass comprising:
a rotor having a spin axis;
first bearings supporting said rotor for rotation about said spin axis;
a gimbal supporting said rotor bearings;
means for rotating said rotor about said spin axis relative to said gimbal;
second bearings supporting said gimbal for free rotation about an axis perpendicular to said spin axis;
a gyroscope case supporting said second bearings;
a frame;
flexure bearing means for suspending said gyroscope case from said frame pendulously with angular freedom about only a horizontal axis perpendicular to said axis of support of said gimbal;
pickoff means for detecting rotational displacement of said gimbal relative to said gyroscope case;
amplifying means connected to be responsive to signals from said pickoff means; and
torquing means, attached between said gyroscope case and said gimbal for applying torque between said gyroscope case and said gimbal to minimize the output of said pickoff means, said torquing means being connected to be driven by said amplifier means.

5. A device as recited in claim 4 and further comprising means for measuring the torquing current supplied by said amplifier to said torquing means.

6. In combination:
a gyroscope having a rotor, a gimbal rotatably supporting said rotor for rotation about its spin axis, means for spinning said rotor, a case supporting said gimbal for rotation about an output axis normal to the rotor spin axis, pickoff means for sensing angular displacement between said case and said gimbal about said last named axis, and torquing means attached and adapted to apply a torque between said case and said gimbal about said last named axis;
a support;
a frame carried by said support and free to turn relative to said support about a substantially vertical axis;
flexure bearing means for pendulously supporting said gyroscope case from said frame with freedom of rotation solely about a horizontal axis perpendicular to said output axis of rotation of said gimbal; and
means connecting said pickoff means and said torquing means to cause said torquing means to maintain the axis of spin of said gyroscope perpendicular to the axis of pendulous support of said case.

7. A device as recited in claim 6 in which said torquing means is electrical torquing means, said pickoff means is electrical pickoff means, and further comprising amplifying means connected between said pickoff means and said torquing means.

8. A device as recited in claim 7 in which said output axis of rotation of said gimbal relative to said case is vertical.

References Cited by the Examiner

UNITED STATES PATENTS

| | | | |
|---|---|---|---|
| 2,599,124 | 6/1952 | Pritchard et al. | 33—222.7 |
| 2,735,731 | 2/1956 | Freebairn et al. | 74—5 X |
| 2,797,580 | 7/1957 | Taylor | 74—5 |
| 2,887,784 | 5/1959 | Carter | 33—226 |
| 2,970,382 | 2/1961 | Notomi | 33—226 |
| 2,972,195 | 2/1961 | Campbell et al. | 33—226 |
| 2,976,618 | 3/1961 | Campbell et al. | 33—226 |
| 3,119,607 | 1/1964 | Wilcox et al. | 74—5 X |

FOREIGN PATENTS 584,486   10/1959   Canada.

ROBERT B. HULL, *Primary Examiner.*